United States Patent [19]

Kawamura

[11] Patent Number: 5,333,582
[45] Date of Patent: Aug. 2, 1994

[54] PRE-COMBUSTION CHAMBER GAS ENGINE

[75] Inventor: Hideo Kawamura, Kanagawa, Japan

[73] Assignee: Isuzu Ceramics Research Institute Co., Ltd., Kanagawa, Japan

[21] Appl. No.: 127,884

[22] Filed: Sep. 28, 1993

[30] Foreign Application Priority Data

Sep. 29, 1992 [JP] Japan ................. 4-282223

[51] Int. Cl.⁵ ............................................. F02B 19/02
[52] U.S. Cl. ..................................... 123/254; 123/257; 123/270; 123/279; 123/292
[58] Field of Search ................. 123/256, 257, 270, 271, 123/279, 292, 254

[56] References Cited

U.S. PATENT DOCUMENTS

| | | | |
|---|---|---|---|
| 4,939,984 | 7/1990 | Fletcher-Jones | 123/279 X |
| 4,998,517 | 3/1991 | Kawamura | 123/270 |
| 5,054,443 | 10/1991 | Kawamura | 123/292 X |
| 5,069,178 | 12/1991 | Kawamura | 123/292 X |
| 5,115,775 | 5/1992 | Gruenwald | 123/257 X |
| 5,156,123 | 10/1992 | Kawamura | 123/256 |
| 5,178,109 | 1/1993 | Kawamura | 123/292 |

FOREIGN PATENT DOCUMENTS

| | | |
|---|---|---|
| 397521 | 11/1990 | European Pat. Off. . |
| 503973 | 9/1992 | European Pat. Off. . |
| 660256 | 5/1938 | Fed. Rep. of Germany . |
| 1401958 | 12/1968 | Fed. Rep. of Germany . |
| 2145206 | 4/1972 | Fed. Rep. of Germany . |
| 945255 | 4/1949 | France . |
| 156911 | 12/1979 | Japan . |
| 41068 | 8/1991 | Japan . |

Primary Examiner—Willis R. Wolfe
Attorney, Agent, or Firm—Browdy and Neimark

[57] ABSTRACT

This invention provides a pre-combustion chamber gas engine capable of being applied to a two-stroke gas engine using a natural gas as fuel. A gas fuel is supplied to precombustion chambers with communication ports, which allows communication between primary chambers and pre-combustion chambers, closed with control valves provided therein, and suction air is supplied to cylinders and compressed under a high pressure. Even when the suction air is compressed under a high pressure in the primary chambers, the self-ignition of gas fuel does not occur therein since a gas fuel does not exist therein, so that knocking does not occur. Each of the control valves provided in the communication ports is constructed so that a lift amount thereof can be varied by a controller. A magnetic force is controlled by regulating the level of an electric current supplied to each coil, in response to a detected signal from a load sensor, and the lift amount of the control valve can be controlled by the resultant magnetic force against the resilient force of a leaf spring. The compressed air is introduced into each pre-combustion chamber by opening the relative communication port, and ignited and burnt. An annularly and conically expanded flame ejected from each pre-combustion chamber then crosses a squish flow in the relative primary chamber to accelerate the mixing of the flame with suction air, reduce the length of combustion time and complete the secondary combustion of the gaseous mixture.

17 Claims, 6 Drawing Sheets

PRE-COMBUSTION CHAMBER GAS ENGINE

BACKGROUND OF THE INVENTION:

1. Field of the Invention

This invention relates to a pre-combustion chamber gas engine provided with a control valve in a communication port via which a pre-combustion chamber to which a gas fuel consisting of a natural gas from a fuel supply source is supplied and a primary chamber to which suction air is supplied communicate with each other.

2. Description of the Prior Art

An engine using a natural gas as a main fuel has heretofore been developed as an automobile engine. On the other hand, a co-generation engine has been developed to reduce urban exhaust gas emissions. In a co-generation type engine, motive power is taken out as electric energy by a generator, and water is heated with a heat exchanger by using the heat of the exhaust gas energy, to be turned to hot water, which is utilized as hot water supply. A co-generation type engine is expected to be utilized as an urban electric current supply system. An engine using a natural gas as fuel is disclosed in, for example, Japanese Patent Laid-open No. 156911/1979 and Japanese Utility Model Publication No. 41068/1991.

The internal combustion engine disclosed in Japanese Patent Laid-open No. 156911/1979 is adapted to compress suction air and supply the resultant air to a primary chamber, supply a part of the suction air to an ignition chamber, inject a hydrocarbon fuel into the ignition chamber to produce a rich mixture, further compress the air and mixture, inject the above-mentioned fuel into the primary chamber, further compress on the other hard the air and mixture to produce a lean mixture in the primary chamber, ignite the mixture in the ignition chamber before the perfect compression of the two mixtures has been attained, to produce a flow of a hot gas, and introduce this flow of a hot gas into the mixture in the primary chamber to ignite the same mixture.

The diesel engine disclosed in Japanese Utility Model Publication No. 41068/1991 is a dual fuel injection type engine provided in its cylinder head with an injection valve from which a liquid fuel is injected and an injection valve from which a gas fuel is injected. The gas fuel injection valve and a liquefied fuel gas tank in which a gas fuel is stored are connected together by two systems of gas passages, i.e. a high-pressure gas passage and a low-pressure gas passage. These gas passages are provided therein with a high-pressure compressor and a low-pressure compressor respectively for pressurizing a gas fuel to different levels of pressure and send the resultant fuel to the gas fuel injection valve. The gas fuel injection valve has a nozzle port for ejecting a high-pressure gas from the high-pressure gas passage and a nozzle port for ejecting a low-pressure gas from the low-pressure gas passage.

The fuel for a gas engine using a natural gas as fuel consists of a gas. Therefore, if an engine in which a gas fuel is burnt excellently at a high compression ratio can be manufactured, it can be operated as a gas engine using as fuel a natural gas which is said to be limitlessly obtainable.

In a gas engine, a gas fuel is sucked into a combustion chamber through a suction valve, compressed and ignited. Accordingly, the compression ratio cannot be set high, and a theoretical thermal efficiency ($\eta$=thermal conversion value of work/calorific value of fuel) is not necessarily high. In a conventional gas engine, a compression ratio is around 12–13, and a theoretical thermal efficiency only 48%. When the motive power of a gas engine is converted into electric energy, the effective thermal efficiency becomes 34–35% or breaks the 30% level Therefore, in a gas engine, 65–70% of fuel is discharged as a cooling water loss and exhaust gas energy, and, even when hot water is produced by a heat exchanger by using thermal energy and stored as hot water supply, the quantity of the hot water becomes too large, and the hot water cannot be utilized sufficiently in practice in general utility equipment. Moreover, the electric energy obtained from a gas engine costs much.

Improvement in thermal efficiency is currently expected in picking up electric energy from a gas engine. Under the circumstances, employing a heat insulating structure in a gas engine so as to improve the thermal efficiency has come to be studied. In a gas engine, a natural gas is sued as fuel, so that, when a gas sucked in a suction stroke is then compressed, high pressure and high temperature result. This causes a self-ignition phenomenon, i.e. knocking to occur. Unless the compression ratio of a gas fuel consisting of a natural gas is not higher than 12 the gas fuel is self-ignited. The thermal efficiency of an engine becomes low when the compression ratio is low. Accordingly, a gas engine has an issue as to how to set a compression ratio to a higher level while avoiding the self-ignition of a gas fuel.

In a heat insulating engine in which the temperature of the wall surface of a combustion chamber increases, a problem that the fuel supplied to the combustion chamber self-ignites before proper ignition time becomes severe. In a heat insulating engine, the temperature of the wall surface of a combustion chamber becomes as high as not lower than about 600° C. Therefore, when a heat insulating engine using a natural gas or gasoline as fuel is constructed so that a compression ratio becomes high, a fuel gas and air from a suction valve are mixed and compressed at a high pressure, and self-ignition occurs, combustion starting in a position much short of a top dead center. Consequently, knocking occurs, and the engine becomes unable to be operated properly.

Therefore, constructing a gas engine as follows is thought of. A pre-combustion chamber and a primary chamber are provided, and a control valve is installed in a communication port via which the pre-combustion chamber and primary chamber communicate with each other, the pre-combustion chamber being charged with a gas fuel with suction air supplied to the primary chamber, the control valve being operated in a position in the vicinity of a compression top dead center TDC to open the communication port, mix the air and gas fuel with each other and ignite the resultant mixture. Such a gas engine poses an important issue of how to mix a gas fuel with air excellently.

SUMMARY OF THE INVENTION:

An object of the present invention is to resolve these issues, and provide a pre-combustion chamber gas engine which has communication ports via which pre-combustion chambers formed in a cylinder head and primary chambers formed in cylinders communicate with each other, and control valves disposed in the communication ports, and which is adapted to charge the pre-combustion chambers with a gas fuel while supplying suction air to the primary chambers, and operate the control valves in positions in the vicinity of compression to dead centers to open the communication ports, mix the air with the gas fuel and ignite the resultant mixtures, characterized in that, when the control valves are opened and closed every time the engine is rotated, the degree of opening of the control valves is regulated by varying a lift amount thereof in accordance with an engine load, to accelerate the mixing of the air with the gas fuel and regulate the ejection of flames and gaseous mixture from the pre-combustion chambers into the primary chambers, whereby the combustion in the primary chambers can be accelerated.

Another object of the present invention is to provide a pre-combustion chamber gas engine comprising communication ports via which precombustion chambers formed in a cylinder head and primary chambers formed in cylinders communicate with each other, fuel passages through which a gas fuel from a fuel supply source is supplied from fuel inlets to the pre-combustion chambers, fuel valves disposed in the fuel inlets so as to open and close the fuel inlets, and control valves having lift amount varying means and disposed in the communication ports so as to control the opening and closing of the communication ports. Each of the control valves consists of a valve head and a valve stem. Each of the lift amount varying means consists of inner and outer magnetic paths provided around the valve stem, a coil provided between the inner and outer magnetic paths, a leaf spring fixed to the valve stem, and a magnetic plate contacting the outer magnetic path, set so that a clearance corresponding to a maximum lift amount occurs with respect to the inner magnetic path, and fixed to the leaf spring. When an electric current is applied to the coil, the magnetic plate is magnetized and attracted to the inner magnetic path, and the control valve can be lifted within the range of the clearance against the resilient force of the leaf spring.

This pre-combustion chamber gas engine has a sensor for detecting the operational condition of the engine, and a controller adapted to control the magnetic force by regulating the electric current, which flows to the coil, in response to a detected signal from the sensor, and control the lift amount of the control valve by this magnetic force against the resilient force of the leaf spring, so that it is possible to vary the degree of opening of the control valve in accordance with a load on the engine, control this degree of opening to an optimum level corresponding to the operational condition of the engine, and excellently accelerate the mixing of the air with a gas fuel. Accordingly, it is possible to control by the controller the magnetic force by regulating the electric current, which flows to the coil, in response to the detected signal from the sensor adapted to detect the operational condition of the engine, and control the lift amount of the control valve by the magnetic force against the resilient force of the leaf spring. For example, it is possible to carry out control operations for increasing the lift amount of the control valve to a maximum level in response to a full load signal from the sensor, and reducing the lift amount thereof in response to a partial load signal from the sensor.

In this pre-combustion chamber gas engine, the control valve is opened and closed every time the engine is rotated, and it is possible to vary the degree of opening of this valve in accordance with the load on the engine, and accelerate the mixing of the air with a gas fuel. When a fuel valve for opening and closing the fuel passage extending to the pre-combustion chamber is provided in this pre-combustion chamber gas engine, it becomes possible to heighten the compression ratio to around 20 by supplying a gas fuel to the pre-combustion chamber and suction air to the primary chamber with the primary and pre-combustion chambers shut off from each other by the control valve, and compressing the gaseous mixture; attain a high thermal efficiency and improve the performance of the engine; burn a rich gaseous mixture in the pre-combustion chamber; and minimize the generation of NOx.

Another object of the present invention is to provide a pre-combustion chamber gas engine wherein four strokes including a scavenging/suction stroke, a compression stroke, an expansion stroke and an exhaust stroke are carried out in two motions, comprising a cylinder block in which cylinders are formed, a cylinder head fixed to the cylinder block, suction/exhaust ports provided at the lower portions of the cylinders, pistons adapted to be moved reciprocatingly in the cylinders, pre-combustion chambers formed in the cylinder head, fuel passages adapted to supply a gas fuel from a gas fuel supply source to the pre-combustion chambers therethrough and formed in the cylinder head, fuel valve adapted to establish and cut off the communication between the fuel passages and pre-combustion chambers, communication ports opened in the central portion of the lower surface of the cylinder head and allowing communication between the pre-combustion chambers and the cylinders, control valves provided on valve seats in the communication ports and having conical valve faces for forming flames, which are ejected from the pre-combustion chambers into the cylinders, into a divergently annular shape, and primary chambers having annular openings in the top surfaces of the pistons and formed in the pistons so that the depth of the primary chambers increases from the central portions thereof toward the circumferential portions thereof along the streamlined patterns of the flames ejected from the pre-combustion chambers.

In this pre-combustion chamber gas engine, each control valve is opened in a position in the vicinity of a compression top dead center to introduce compressed air from the cylinder to the pre-combustion chamber, mix the compressed air with a gas fuel in the pre-combustion chamber and ignite the resultant gaseous mixture. The outer circumferential end portion of the annular opening in the primary chamber forms a radially inwardly convergent lip for promoting the generation of a squish flow toward the primary chamber in a position in the vicinity of the terminal end of a compression stroke.

In this pre-combustion chamber gas engine, the following control operations are carried out. After the exhaust port has been closed, the fuel inlet of the pre-combustion chamber is opened in a position in the vicinity of the midst of a suction stroke and closed in a position in the vicinity of the terminal end of a compression stroke, by the fuel valve provided in the fuel inlet, and, after the fuel valve has been closed, the communication port allowing communication between the pre-combustion chamber and the primary chamber is opened 30°–0° short of the explosion top dead center and closed not less than 30° past the top dead center of an exhaust stroke, by the control valve provided in the communication port. Accordingly, even when the suction air attains a high compression ratio in the primary chamber, the fuel supplied to the pre-combustion chamber is shut off from suction air. Therefore, the fuel is not self-ignited, nor does knocking occur. This enables this pre-combustion chamber gas engine to be formed so as to have a compression ratio of as high as not lower than 20, and a premix air supply type engine of a high efficiency to be provided.

Figure 1:
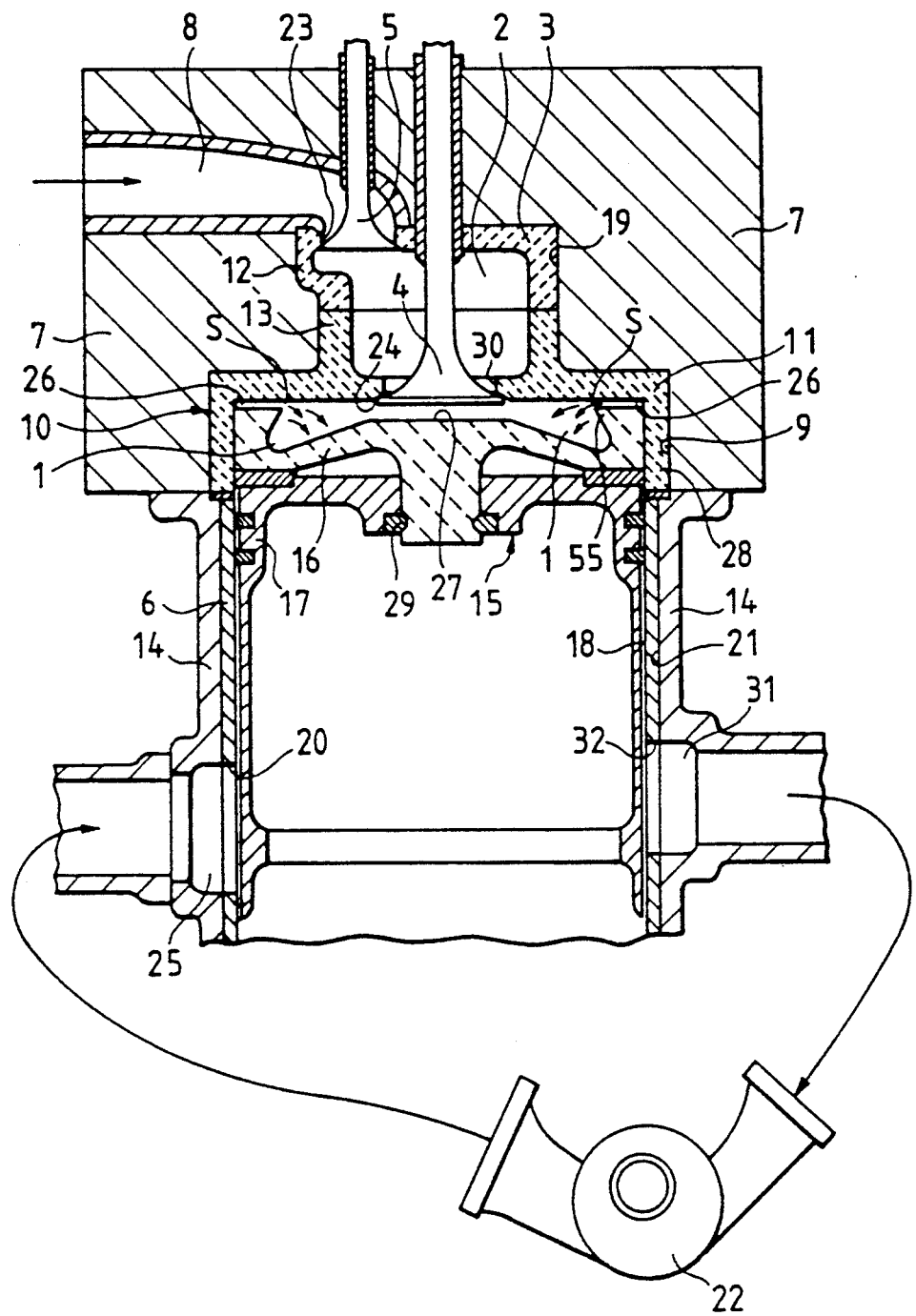
FIG. 1 is a sectional view of an embodiment in which the pre-combustion chamber gas engine according to the present invention is applied to a two-stroke type engine.

DESCRIPTION OF THE PREFERRED EMBODIMENTS:

An embodiment in which the pre-combustion chamber gas engine according to the present invention is applied to a two-stroke gas engine will now be described with reference to FIGS. 1 and 2. This pre-combustion chamber gas engine is applied to a two-stroke gas engine, and has a cylinder block 14 provided with a scavenging port, i.e. a suction port 25 and an exhaust port 31, a cylinder head 7 fixed to the cylinder block 14, a cylinder liner 6 which is fitted in a bore 21 formed in the cylinder block 14, and which forms a cylinder 18, a scavenging hole, i.e. a suction hole 20 formed in the cylinder liner 6 and communicating with the suction port 25 formed in the cylinder block 14, an exhaust hole 32 formed in the cylinder liner 6 and communicating with the exhaust port 31, a combustion chamber wall consisting of a ceramic material and forming a pre-combustion chamber 2 in a cavity 19 of the cylinder head 7, a piston 15 adapted to be moved reciprocatingly in the cylinder 18 formed in the cylinder liner 6, a primary chamber 1 consisting of a cavity formed in a piston head 16 of the piston 15, and a communication port 30 formed in the combustion chamber wall and communicating the primary chamber and pre-combustion chamber 2 with each other. The combustion chamber wall also forms a part of the primary chamber 1 besides the pre-combustion chamber 2.

In this pre-combustion chamber gas engine, the combustion chamber wall consists of the head liner 10 composed of a ceramic material and formed in the cavity 9 of the cylinder head 7, and the pre-combustion chamber wall 3 formed unitarily with the head liner 10. The head liner 10 consists of a liner upper 28 forming a part of the cylinder 18, and a head lower surface portion 11. The pre-combustion chamber wall 3 forming the pre-combustion chamber 2 is formed on the upper surface of and unitarily with the head lower surface portion 11. The pre-combustion chamber wall 3 consists of upper and lower wall members 12, fitted in the cavity 19 of the cylinder head 7. The communication port 30 is formed in the part of the head lower surface portion 11 which corresponds to the central portion of the cylinder. The piston 15 consists of the piston head 16 composed of a ceramic material, such as silicon nitride having a high thermal resistance, and a piston skirt 17 fixed to the piston head 16 by a metal flow method via a connecting ring 29.

In this pre-combustion chamber gas engine, a natural gas as a gas fuel from a gas fuel supply source is supplied from a fuel inlet 23 formed in the cylinder head 7 to the pre-combustion chamber 2 through the fuel passage 8. This pre-combustion chamber gas engine has a fuel valve 5 provided in the fuel inlet 23 so as to regulate the feed rate of the gas fuel supplied to the pre-combustion chamber 2, and a control valve 4 provided in the communication port 30. Since the temperature in the region of the communication port 30 increases to a high level due to a combustion gas, the control valve 4 provided in the communication port 30 is formed out of a ceramic material, such as silicon nitride and silicon carbide which are superior in the high-temperature strength and thermal resistance. The fuel valve 5 has a solenoid valve driving means which is opened and closed by an electromagnetic force, and a valve-opening term is determined in accordance with an engine load. When the fuel inlet 23 is opened by the fuel valve 5, a required quantity of a gas fuel consisting of a natural gas is supplied to the pre-combustion chamber 2.

This pre-combustion chamber gas engine further has a turbo-charger 22, and the exhaust gas discharged from the exhaust port 31 is sent to a turbine in the turbo-charger 22. The turbine driven by the exhaust gas energy actuates a compressor, and the air compressed thereby is supplied from the suction port 25 to the interior of the cylinder 18.

This pre-combustion chamber gas engine is provided with suction and exhaust ports 25, 31 in the lower portion of the cylinder to give a high degree of freedom to the shape of the primary chamber formed in the piston head 16, whereby the primary chamber 1 of an ideal shape is formed in the piston head 16. The control valve 4 is provided on a valve seat 24 formed in the communication port 30 opened in the central part of the head lower surface portion 11 of the cylinder head 7, and has a conical valve face 36 (FIG. 2) so that a flame ejected from the pre-combustion chamber 2 into the cylinder 18 forms a divergent annular shape. The primary chamber 1 formed in the piston head 16 extends so that the depth thereof increases from the central portion thereof toward the circumferential portion thereof along the streamlined pattern of a divergent annular flame ejected from the pre-combustion chamber 2 into the cylinder 18 through the communication port 30. The central portion of the piston head 16 has a flat surface 27 so that the flat surface 27 forms an escape clearance when the control valve 4 is opened, and reduces a useless volume of space. The primary chamber 1 is formed so that the depth thereof increases from the periphery of the flat surface 27 toward that of the piston head 16. The outer circumferential edge of the primary chamber 1 forms a convergent lip 55 so that a squish flow S, which occurs due to the entry of the air from a clearance 26 into the primary chamber 1, is formed excellently.

In this pre-combustion chamber gas engine, the control valve 4 is opened in a position in the vicinity of a compression top dead center to introduce compressed air from the cylinder 18 into the pre-combustion chamber 2, in which the compressed air and a gas fuel are mixed and ignited. The head liner 10 which is a wall forming the primary chamber 1, the upper and lower wall members 12, 13 constituting the pre-combustion chamber wall 3 forming the pre-combustion chamber 2, and the cylinder liner 6 and piston head 16 are preferably formed out of a ceramic material, for example, silicon nitride and silicon carbide which have a high thermal resistance. Owing to such a material, the gas engine 10 has sufficient levels of thermal resistance and high-temperature strength even when the temperature of the gas in the later stage of combustion becomes high, and a discharge rate of unburnt hydrocarbon HC decreases, so that the thermal energy occurring in the pre-combustion chamber 2 and primary chamber 1 can be sent to the turbo-charger 22. When a generator-motor is provided in the turbo-charger 22, or when an energy recovery means is provided on the downstream side of the turbo-charger 22, the thermal energy occurring in the pre-combustion chamber gas engine can be recovered reliably, and a gas engine of a high efficiency can be provided.

In this pre-combustion chamber gas engine, four strokes, i.e. a scavenging/suction stroke, a compression stroke, an expansion stroke and an exhaust stroke are made by one revolution of a crankshaft, i.e., by two strokes of the piston 15, and the engine is operated by repeating these strokes in order. First, in a suction stroke, suction air is supplied from the suction port 25 formed in the lower portion of the cylinder to the interior of the cylinder 18, and the fuel valve 5 is opened with the communication port 30 closed with the control valve 4, to supply a gas fuel consisting of a natural gas from a gas fuel supply source to the pre-combustion chamber 2 through the fuel passage 8. During this time, an exhaust gas occurring after combustion of the fuel resides in a small amount in the pre-combustion chamber. Therefore, when a gas fuel is introduced into the pre-combustion chamber 2, the gas fuel receives heat and is activated therein. In a compression stroke, the communication port 30 is left closed with the control valve 4, and suction air is compressed at a high pressure in the primary chamber 1 to increase the compression ratio to a high level.

The communication port 30 is then opened by the control valve 4 in a final stage of a compression stroke, i.e., in a position in the vicinity of the compression top dead center TDC, and highly compressed high-temperature (for example, 650° C.) air is introduced from the primary chamber 1 into the pre-combustion chamber 2 through the communication port 30, the mixing of the suction gas with the activated gas fuel being accelerated, the resultant gaseous mixture being ignited and burnt, the combustion progressing speedily with rich fuel and a low rate of generation of NOx. Therefore, even when the compression ratio of suction air in the primary chamber becomes high, the self-ignition of gas fuel as well as knocking do not occur since a gas fuel is not contained in this suction air. Moreover, since the communication port 30 is opened, highly-compression suction air flows from the primary chamber 1 into the pre-combustion chamber 2 due to the velocity of flow of the air flowing from the clearance between the communication port 30 and control valve 4, and the gas fuel and compressed air are mixed speedily, the resultant gaseous mixture being ignited. In this condition, the equivalent ratio of the fuel is high, i.e., the gaseous mixture is ignited and burnt with the fuel in a rich condition, so that the occurrence of NOx is minimized.

The gas fuel which has finished being mixed with suction air is ignited and burnt to be turned into expanded flames, which is ejected from the pre-combustion chamber 2 into the primary chamber 1 through the communication port 30 and mixed with the fresh air in the primary chamber 1. During this time, the clearance between the control valve 4 and communication port 30 forms a cross-sectionally circular passage, in other words, a cross-sectionally conically annular passage, which extends divergently toward the primary chamber 1, so that the flame ejected from the pre-combustion chamber 2 into the primary chamber 1 through the communication port extends in the shape of a divergent ring. Moreover, since the primary chamber 1 in the piston head 16 is formed so that the depth thereof increases from the central portion thereof toward the peripheral portion thereof along the streamlined pattern of a flame ejected from the pre-combustion chamber 2, a squish flow S advancing into the primary chamber 1 in accordance with a decrease in the height of the clearance between the top surface of the piston head 16 and the head lower surface portion 11 crosses the divergent ring-shaped ejected flame, and the mixing of the air with the ejected flame is accelerated in the primary chamber 1. The flames in the pre-combustion chamber 2 are ejected into the primary chamber 1, and the compression stroke is shifted to a combustion stroke, i.e. an expansion stroke, and the mixing of the flame with the fresh air in the primary chamber 1 is accelerated, secondary combustion being thus completed in a short period of time. In an expansion stroke, the flame is ejected from the pre-combustion chamber 2 into the primary chamber 1 with the communication port 30 kept opened, to carry out work, the control valve 4 being actuated in a position in the vicinity of a terminal end of an exhaust stroke to close the communication port 30.

Since the communication port 30 is opened by the control valve 4, the highly-compressed suction air flows from the primary chamber 1 into the pre-combustion chamber 2, and a gas fuel and suction air are mixed with each other and ignited, the combustion of the gaseous mixture being carried out at a high rate with a high equivalent ratio, i.e., with the fuel in a rich condition, whereby the generation of NOx is minimized. After the combustion of the gaseous mixture is completed, a gas fuel from the gas fuel supply source is introduced into the exhaust gas-containing pre-combustion chamber 2, and receives heat therein to be activated. When the fuel valve 5 in this pre-combustion chamber gas engine consists of an electromagnetically driven valve adapted to be driven by an electromagnetic force, it can be set so that the valve-opening term is determined in response to the operational condition of an engine load, and, for example, a proper amount of gas fuel can be supplied to the auxiliary chamber 2 in response to an engine load.

Figure 3:
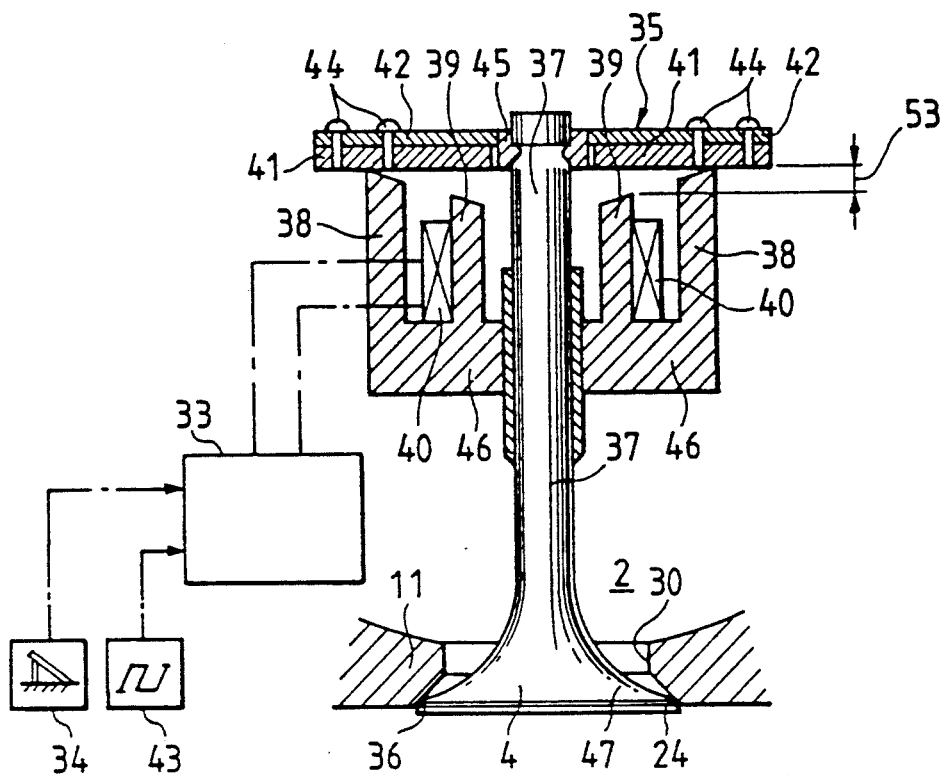
FIG. 3 is a sectional view of an example of the control valve in this pre-combustion chamber gas engine.
Figure 4:
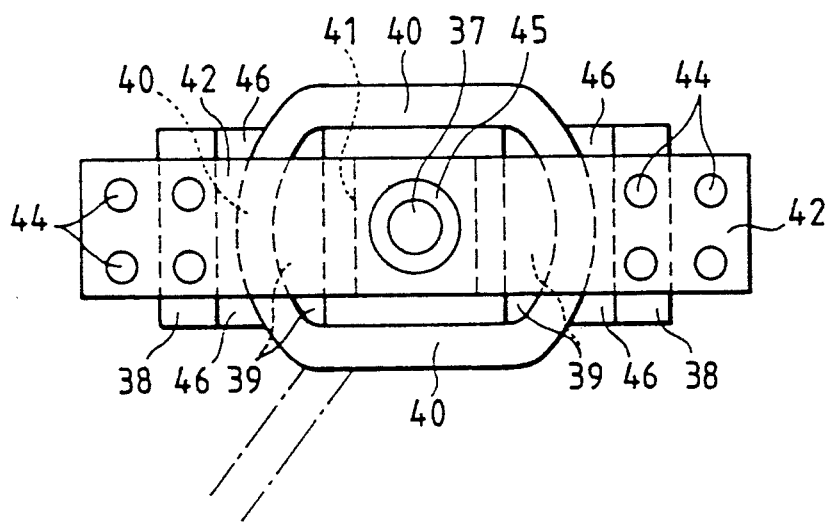
FIG. 4 is a plan view of the control valve of FIG. 3.
Figure 5:
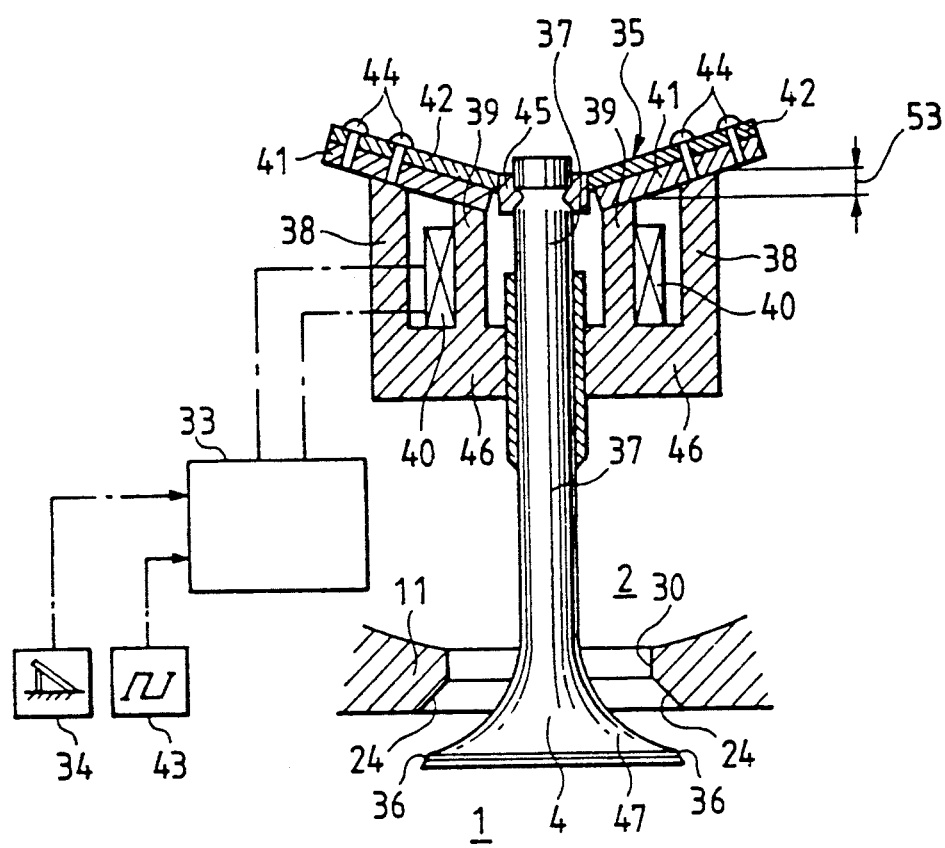
FIG. 5 is a sectional view showing the condition of the control valve of FIG. 3 lifted to a maximum level.

A control valve most preferably incorporated in this pre-combustion chamber gas engine will now be described with reference to FIGS. 3, 4 and 5. The illustrated parts corresponding to those shown in FIG. 1 are designated by the same reference numerals, and the duplication of descriptions thereof is omitted.

In this pre-combustion chamber gas engine, a control valve 4 is provided with a lift amount varying means for controlling a lift amount of the control valve 4 in accordance with the magnitude of an electromagnetic force resisting a spring force. The control valve 4 consists of a valve head 47 having a valve face 36 adapted to engage a valve seat in a communication port 30 and control the opening and closing of the same port 30, and a valve stem 37 formed integrally with the valve head 47. The control valve 4 is driven by a solenoid valve driving means 35, and has an inner magnetic path 39 provided around the valve stem 37, and an outer magnetic path 38 provided on the radially outer side of the inner magnetic path so as to be spaced therefrom, a coil 40 being provided between the inner and outer magnetic paths 39, 38. The inner and outer magnetic paths 39, 38 are joined to each other via a magnetic path 46. The control valve 4 further has a leaf spring 42 fixed to the upper end portion of the valve stem 37 by a cotter 45, and a magnetic plate 41 fixed to the leaf spring 42 by rivets 44. The magnetic plate 41 is set so that both end portions thereof contact the outer magnetic path 38 with a clearance which corresponds to a maximum lift of the control valve 4 left with respect to the inner magnetic path The top surfaces, which are opposed to the magnetic plate 14, of the inner and outer magnetic paths 39, 38 are preferably so formed that they are inclined at an angle equal to a maximum angle of inclination of the magnetic plate 41 so as to enable these two top surfaces to contact each other when the inner and outer magnetic paths 39, 38 are magnetized to attract the magnetic plate 41. Since the magnetic plate 41 has the resilient force of the leaf spring 42, it is attracted and inclined to such an extent that corresponds to the magnetic force of the inner and outer magnetic paths 39, 38, to lift the control valve 4. Even when the control valve 4 is lifted to a maximum level, it is within the clearance. The leaf spring 42 is preferably formed out of a permeable silicon steel plate having little loss.

This pre-combustion chamber gas engine also has a sensor unit for detecting the operational condition of the engine, and a controller 33 adapted to control the magnetic force by regulating the level of an electric current flowing to a coil 40 in response to a detected signal from this sensor unit, and control the lift amount of the control valve 4 against the resilient force of the leaf spring 42 by this magnetic force. This sensor unit has a revolution sensor 43 for detecting the number of revolutions per minute of the engine, and a load sensor 34 for detecting an engine load. The controller 33 is capable of carrying out control operations for increasing the lift amount of the control valve 4 to a maximum level in response to a full-load signal from the load sensor 34 and reducing the lift amount thereof in response to a partial-load signal from the same sensor 34. Accordingly, the level of the magnetic force for lifting the control valve 4 is varied by controlling the level of the electric current supplied to the coil 40, by which a magnet is controlled, by the controller 33, and the lift amount thereby varies to a position in which the regulated magnetic force and the resilient force of the leaf spring 42 are balanced with each other.

This pre-combustion chamber gas engine most preferably uses the above described control valve 4, and is operated as follows. In this pre-combustion chamber gas engine, the control valve 4 is opened and closed with respect to the communication port 30 every time the engine is rotated, and the degree of opening controlled by the control valve 4 of the communication port 30 can be varied in accordance with an engine load, whereby the mixing of the air with the gas fuel can be further accelerated.

When the level of a detected signal of an engine load from the load sensor 34 is low, i.e., when a partial-load signal is detected, the ejection energy of flame and gaseous mixture from the pre-combustion chamber 2 into the primary chamber 1 is small. Therefore, the ejection speed of flame and gaseous mixture from the pre-combustion chamber 2 into the primary chamber 1 is increased by reducing the degree of opening of the control valve 4 by the controller 33, to accelerate the mixing of the ejected gas with fresh air in the primary chamber 1 and reduce the combustion term and the rate of generation of HC and NOx. When the level of a detected signal of an engine load from the load sensor 34 is high, i.e., when a full-load signal is detected, the expansion force due to the gas fuel in the pre-combustion chamber 2 is large, so that the ejection energy of flame and gaseous mixture from the pre-combustion chamber 2 into the primary chamber 1 becomes large. Accordingly, an operation for increasing the degree of opening of the control valve 4 is carried out by the controller 33, and the flame and gaseous mixture are ejected with one rush from the pre-combustion chamber 2 into the primary chamber 1 through the communication port 30, the ejected gas being thereby mixed speedily with the fresh air in the primary chamber 1 to increase the combustion rate and reduce the combustion term and the rate of generation of HC and NOx.

Figure 6:
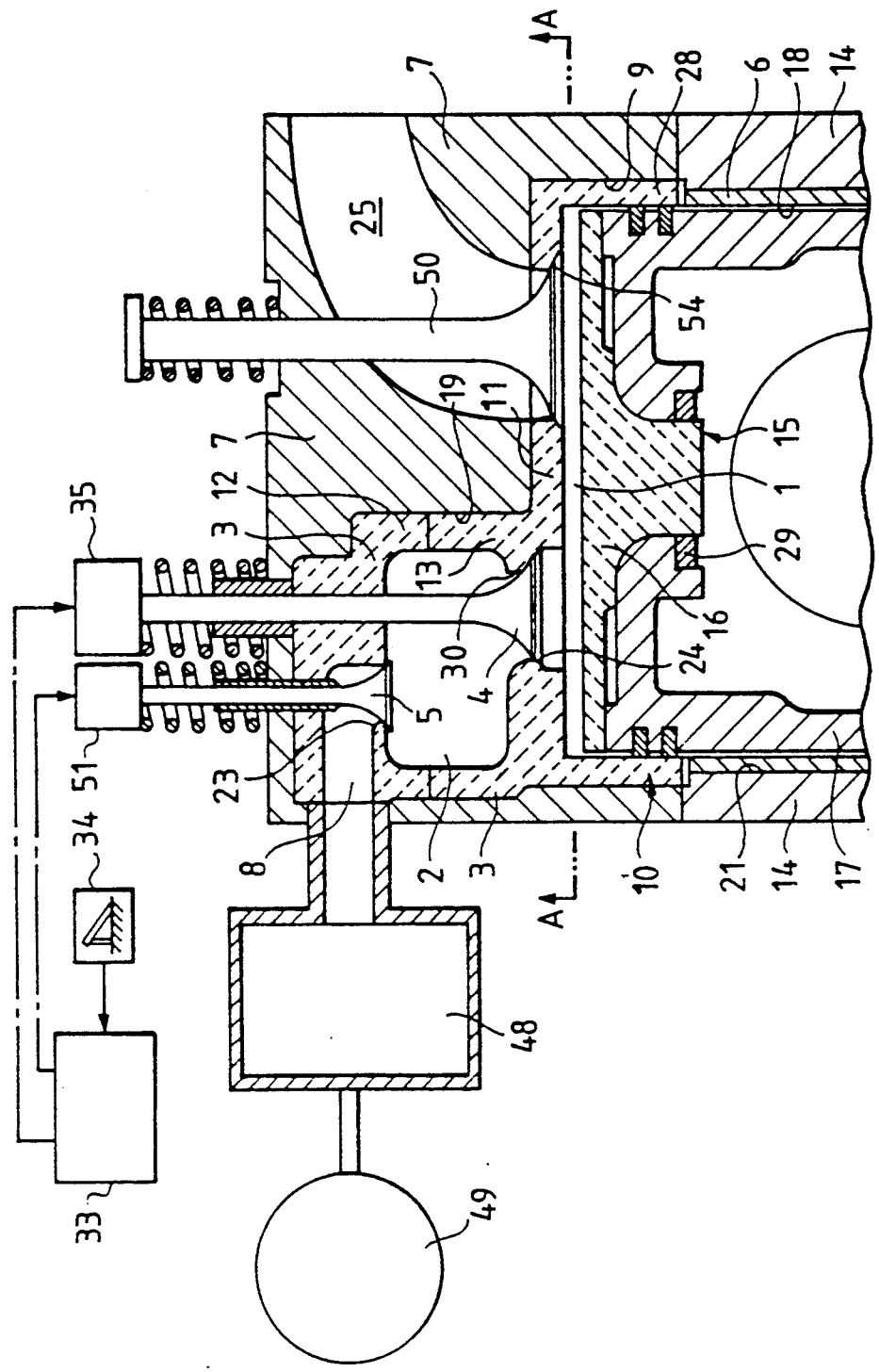
FIG. 6 is a sectional view of another embodiment of the pre-combustion chamber gas engine according to the present invention.
Figure 7:
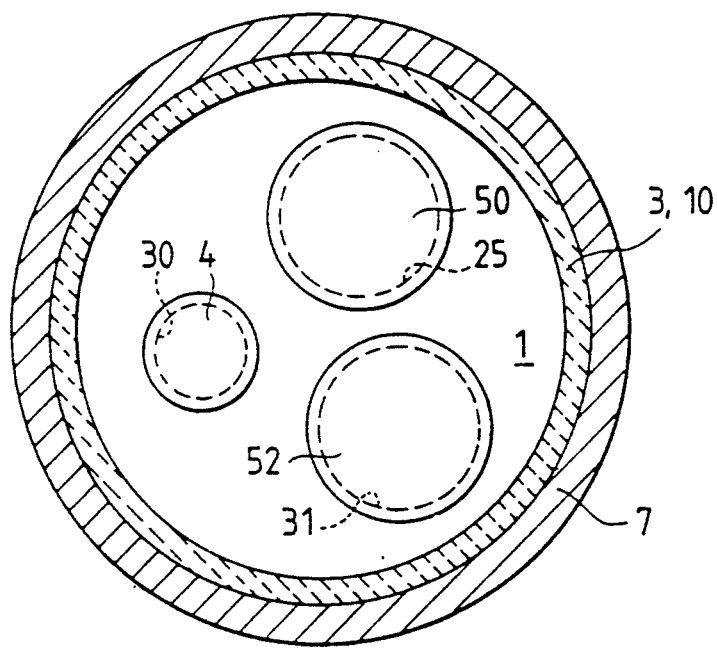
FIG. 7 is a sectional view of the pre-combustion chamber gas engine of FIG. 6 taken along the line A—A therein.

Another embodiment of this pre-combustion chamber gas engine will now be described with reference to FIGS. 6 and 7. The parts shown in FIGS. 6 and 7 which correspond to those shown in FIG. 1 are designated by the same reference numerals and the duplication of descriptions thereof is omitted.

Figure 2:
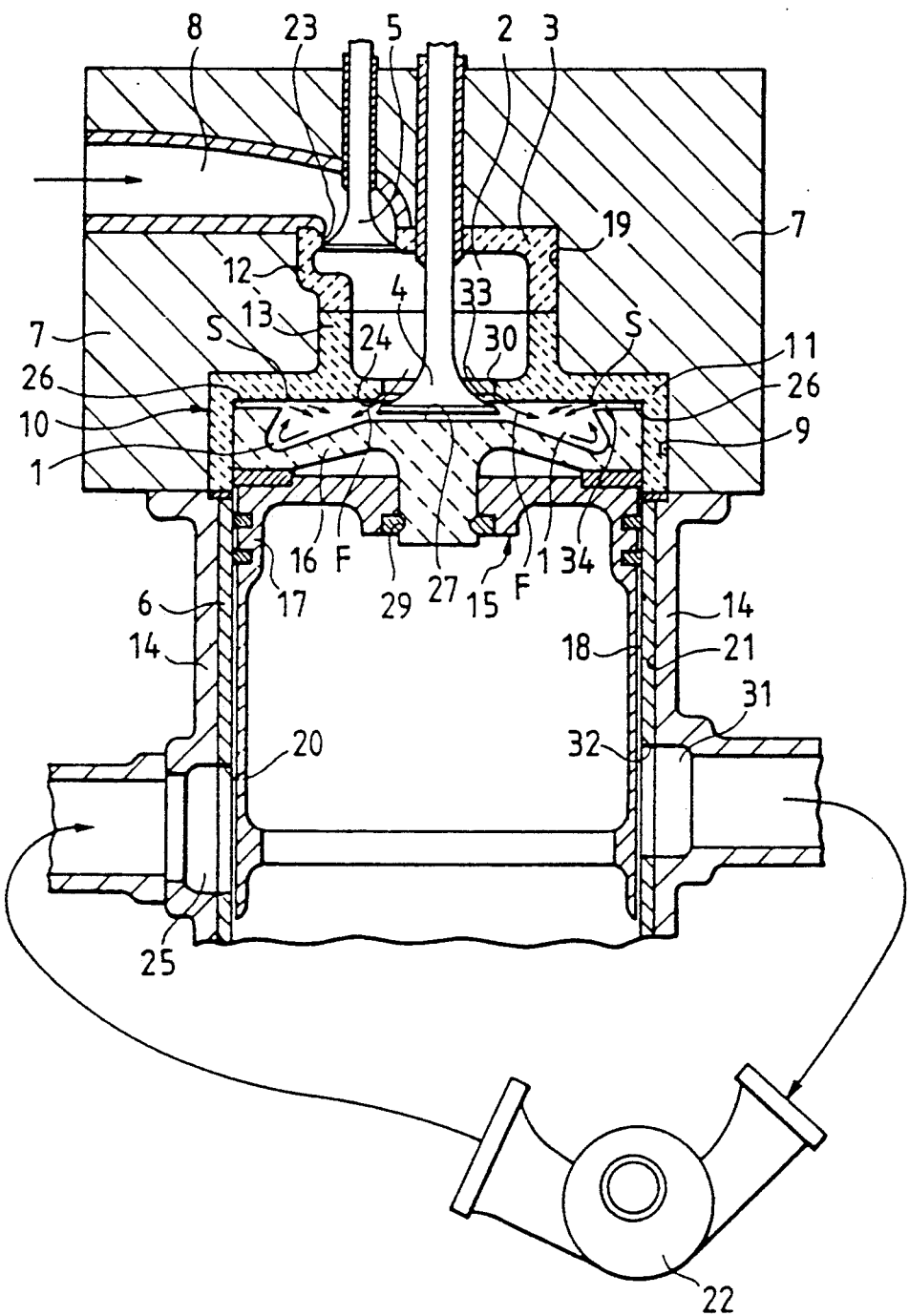
FIG. 2 is a sectional view illustrating the condition of the pre-combustion chamber gas engine of FIG. 1 with a control valve opened.

In this pre-combustion chamber gas engine, suction and exhaust ports 25, 31 are formed in a cylinder head 7, and a pre-combustion chamber 2 is provided in a peripheral portion thereof accordingly, the remaining portions having substantially the same construction as the corresponding portions of the pre-combustion chamber gas engine shown in FIG. 1. The pre-combustion chamber gas engine of FIGS. 6 and 7 has a suction port 25 formed in the cylinder head 7, a suction valve 50 provided in the suction port 25, an exhaust port 31 formed in the cylinder head 7, and an exhaust valve 52 provided in the exhaust port 31. A valve seat 54 for the suction and exhaust valves 50, 52 and a valve seat 24 for a control valve 4 are formed in a head lower surface portion 11.

This pre-combustion chamber gas engine further has a fuel tank 49 in which a natural gas as fuel is stored, an accumulator 48 in which the natural gas from the fuel tank 49 is accumulated, and a communication passage 8 via which the pre-combustion chamber 2 and the accumulator 48 communicate with each other so as to supply the natural gas in the accumulator 48 from a fuel inlet 23 to the pre-combustion chamber 2.

This pre-combustion chamber gas engine is constructed as described above and operated as follows. This pre-combustion chamber gas engine is operated by repeating in order four cycles of a suction stroke, a compression stroke, an expansion stroke and an exhaust stroke. The control valve 4 and a fuel valve 5 are opened and closed by an electromagnetic force by solenoid valve driving means 35, 51. The suction valve 50 and exhaust valve 52 are constructed so that they are driven by a valve driving means like a conventional cam-driven valve driving means but these valves may also be constructed in some cases so that they are opened and closed by an electromagnetic force.

In this pre-combustion chamber gas engine, the closing of a communication port 30 by the control valve 4 is done simultaneously with the opening of the suction port 25 by the suction valve 50 in a suction stroke, and suction air is supplied to a primary chamber 1 through the suction port 25. During this operation, the suction port 25 is opened by the suction valve 50 in a position of 30°–40° after the top dead center TDC after the communication port 30 has been closed.

In the midst of a suction stroke, the fuel inlet 23 is opened by the fuel valve 5, and a gas fuel consisting of a natural gas in the accumulator 48 is supplied therefrom to the pre-combustion chamber 2 through the fuel passage 8. When the gas fuel is supplied from the accumulator 48 to the pre-combustion chamber 2, the communication port 30 is closed with the control valve 4, and an exhaust gas occurring after the combustion of the fuel resides in the pre-combustion chamber 2. Therefore, when the gas fuel from the accumulator 48 is introduced into the pre-combustion chamber 2, it receives heat and is activated in the pre-combustion chamber 2.

In this pre-combustion chamber gas engine, the communication port 30 is closed with the control valve 4 up to a position in the vicinity of a final stage of a compression stroke, and the suction air in the primary chamber 1 is compressed to increase the compression ratio. The fuel inlet 23 is then closed with the fuel valve 5, and the supplying of the gas fuel from the accumulator 48 to the pre-combustion chamber 2 is stopped, the communication port 30 being opened by the control valve 4 in a position in the vicinity of a final stage of a compression stroke. Consequently, highly-compressed high-temperature air flows with one rush from the primary chamber 1 into the pre-combustion chamber 2 through the communication port 30. The time at which the communication port 30 is opened by the control valve 4 during this operation is controlled to be between positions of 30°–0° before the explosion top dead center TDC. The suction air accelerates the mixing thereof with the activated gas fuel, and the gaseous mixture is ignited and burnt, the combustion of the gaseous mixture progressing speedily, the flames in the pre-combustion chamber 2 being ejected into the primary chamber 1. The combustion stroke is shifted to an expansion stroke.

In an expansion stroke, the mixing of the fresh air in the primary chamber 1 with flames is accelerated, and the combustion of the gaseous mixture is completed in a short period of time. In the expansion stroke, the flame is ejected from the pre-combustion chamber 2 into the primary chamber 1 with the communication port 30 kept opened, to carry out work, and the expansion stroke is shifted to an exhaust stroke. The exhaust valve 52 is adapted to open the exhaust port 31 in a position in the vicinity of a final stage of an expansion stroke, and close the same in a position in the vicinity of the top dead center of an exhaust stroke. The control valve 4 is adapted to open the communication port 30 in a position of 30°–0° before the top dead center of an explosion stroke, and close the same in a position of up to 30° after the top dead center of an exhaust stroke. The suction valve 50 is adapted to open the suction port 25 in a suction stroke in a position of 30°–40° after the top dead center after the communication port 30 has been closed, and prevent in a subsequent suction stroke the suction air from the suction port 25 from flowing from the primary chamber 1 into the pre-combustion chamber 2.

What is claimed is:

1. A pre-combustion chamber gas engine comprising a cylinder block provided with cylinders, a cylinder head fixed to said cylinder block, combustion chamber walls provided in cavities formed in said cylinder head, pre-combustion chambers formed in said combustion chamber walls, primary chambers formed in the portions of said combustion chamber walls which are on the side of said cylinders, communication ports formed in said combustion chamber walls and allowing communication between said primary chambers and said pre-combustion chambers, pistons adapted to be moved reciprocatingly in said cylinders, fuel inlets formed in said combustion chamber walls so as to supply a gas fuel to said pre-combustion chambers, fuel valves provided in said fuel inlets so as to open and close said fuel inlets, control valves which are provided on valve seats formed in said communication ports, so as to open and close said communication ports, and which are adapted to be actuated by an electromagnetic force, and lift amount varying means for controlling a lift amount of said control valve by an electro-magnetic force resisting the resilient force thereof.

2. A pre-combustion chamber gas engine according to claim 1, wherein said control valves are formed out of a ceramic material having high-temperature strength and high thermal resistance.

3. A pre-combustion chamber gas engine according to claim 1, wherein each of said control valves consists of a valve head provided with a valve face adapted to be seated on said valve seat formed in said communication port, and a valve stem formed integrally with said valve head.

4. A pre-combustion chamber gas engine according to claim 3, wherein each of said lift amount varying means consists of an inner magnetic path and an outer magnetic path arranged around said valve stem of said control valve, a coil provided between said inner and outer magnetic paths, a leaf spring fixed to said valve stem, and a magnetic plate which contacts said outer magnetic path, and which is set so that said magnetic plate has a clearance, the height of which corresponds to a maximum lift amount of said control valve, with respect to said inner magnetic path, and fixed to said leaf spring.

5. A pre-combustion chamber gas engine according to claim 1, wherein said fuel valves are opened and closed by an electromagnetic force, the length of time during which said fuel valves are opened being controlled in accordance with an engine load.

6. A pre-combustion chamber gas engine according to claim 1, wherein said combustion chamber walls are formed out of a ceramic material having high thermal resistance and excellent heat insulating characteristics, said primary chambers and said pre-combustion chambers being formed so as to have a heat insulating capability.

7. A pre-combustion chamber gas engine comprising a cylinder block provided with cylinders, a cylinder head fixed to said cylinder block, combustion chamber walls provided in cavities formed in said cylinder head, pre-combustion chambers formed in said combustion chamber walls, primary chambers formed in the portions of said combustion chamber walls which are on the side of said cylinders, communication ports formed in said combustion chamber walls and allowing communication between said primary chambers and said pre-combustion chambers, pistons adapted to be moved reciprocatingly in said cylinders, fuel inlets formed in said combustion chamber walls so as to supply a gas fuel to said pre-combustion chambers, fuel valves provided in said fuel inlets so as to open and close said fuel inlets, control valves which are provided on valve seats formed in said communication ports, so as to open and close said communication ports, and which are adapted to be actuated by an electromagnetic force, lift amount varying means for controlling a lift amount of said control valve by an electro-magnetic force resisting the resilient force of springs, load sensors adapted to detect the operational condition of said engine, and a controller adapted to control an electromagnetic force in response to detected signals from said load sensors and control a lift amount of said control valves by said electromagnetic force against the resilient force of said lift amount varying means.

8. A pre-combustion chamber gas engine according to claim 7, wherein said controller is adapted to carry out control operations for increasing the lift amount of said control valves to a maximum level in response to full-load signals from said load sensors, and reduce the lift amount of said control valves in response to partial-load signals therefrom.

9. A pre-combustion chamber gas engine according to claim 7, wherein, when said control valves are opened and closed, the degree of opening thereof with respect to said communication ports is regulated by varying the lift amount of said control valves in accordance with an engine load, to accelerate the mixing of air with a gas fuel, regulate the ejection of flames and gaseous mixture from said pre-combustion chambers into said primary chambers and accelerate the combustion of the gaseous mixture in said primary chambers.

10. A pre-combustion chamber gas engine according to claim 7, wherein said fuel valves provided in said fuel inlets are adapted to open said fuel inlets in a position in the vicinity of the midst of a suction stroke and close the same in a position in the vicinity of a terminal end of a compression stroke, said control valves being adapted to be opened in a position 30°-0° short of the top dead center of an explosion stroke and closed in a position up to 30° past the top dead center of an exhaust stroke, after said fuel valves have been closed, whereby said engine can be operated at a high compression ratio.

11. A pre-combustion chamber gas engine wherein four strokes, i.e. a scavenging/suction stroke, a compression stroke, an expansion stroke and an exhaust stroke are made in two motions, comprising a cylinder block provided with cylinders, a cylinder head fixed to said cylinder block, suction and exhaust ports provided in the lower portions of said cylinders, pistons adapted to be moved reciprocatingly in said cylinders, combustion chamber walls provided in cavities formed in said cylinder head, pre-combustion chambers formed in said combustion chamber walls, primary chambers formed in the portions of said combustion chamber walls which are on the side of said cylinders, communication ports formed in said combustion chamber walls and allowing communication between said primary chambers and said pre-combustion chambers, fuel inlets formed in said combustion chamber walls so as to supply a gas fuel to said pre-combustion chambers, fuel valves provided in said fuel inlets so as to open and close said fuel inlets, control valves which are provided on valve seats formed in said communication ports, and which have conical valve faces for forming flames ejected from said pre-combustion chambers into said cylinders into divergent annular patterns, and annular cavities which are formed in said pistons so that the depth thereof increases from the central portions thereof toward the peripheral portions thereof along said patterns of said flames ejected from said pre-combustion chambers into said primary chambers, and which constitute parts of said primary chambers.

12. A pre-combustion chamber gas engine according to claim 11, wherein said fuel valves provided in said fuel inlets are adapted to open said fuel inlets in a position in the vicinity of the midst of a suction stroke and close the same in a position in the vicinity of the terminal end of a compression stroke, said control valves being adapted to open said communication ports in a position 30°-0° short of the top dead center of an explosion stroke and close said communication ports in a position up to 30° past the top dead center of an exhaust stroke after said fuel valves have been closed, whereby said engine can be operated at a high compression ratio.

13. A pre-combustion chamber gas engine according to claim 11, wherein said control valves are adapted to be opened in a position in the vicinity of the top dead center of a compression stroke to introduce compressed air from said cylinders into said pre-combustion chambers, mix the compressed air with a gas fuel in said pre-combustion chambers and ignite the resultant gaseous mixture.

14. A pre-combustion chamber gas engine according to claim 11, wherein the outer circumferential end portion of each of said annular cavities forming said primary chambers is formed in the shape of a radially inwardly projecting convergent lip so as to accelerate a squish flow advancing to said primary chamber, in a position in the vicinity of the terminal end of a compression stroke.

15. A pre-combustion chamber gas engine according to claim 11, wherein each of said combustion chamber walls consists of an upper wall member and a lower wall member which are fitted in said cavity formed in said cylinder, each of said communication ports being formed in the part of a head lower surface portion of the relative lower wall member which corresponds to the central portion of the relative cylinder.

16. A pre-combustion chamber gas engine according to claim 11, wherein each of said pistons consists of a piston head composed of a ceramic material of a high thermal resistance, such as silicon nitride, and a piston skirt fixed to said piston head.

17. A pre-combustion chamber gas engine according to claim 11, wherein the part of each of said pistons which corresponds to the central portion of said annular cavity formed therein has a flat surface which forms an escape space for the relative control valve when said control valve is opened, and which decreases the volume of a useless space in said primary chamber.

* * * * *